United States Patent
Seo et al.

(10) Patent No.: US 10,534,119 B2
(45) Date of Patent: *Jan. 14, 2020

(54) POLARIZER PROTECTIVE FILM, POLARIZING PLATE AND METHOD FOR PREPARING POLARIZING PLATE

(71) Applicant: LG CHEM, LTD., Seoul (KR)

(72) Inventors: Jung Hyun Seo, Daejeon (KR); Yeong Rae Chang, Daejeon (KR); Heon Kim, Daejeon (KR); Hye Min Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 114 days.

This patent is subject to a terminal disclaimer.

(21) Appl. No.: 15/566,134

(22) PCT Filed: Sep. 22, 2016

(86) PCT No.: PCT/KR2016/010590
§ 371 (c)(1),
(2) Date: Oct. 12, 2017

(87) PCT Pub. No.: WO2017/052231
PCT Pub. Date: Mar. 30, 2017

(65) Prior Publication Data
US 2018/0088264 A1    Mar. 29, 2018

(30) Foreign Application Priority Data
Sep. 22, 2015  (KR) ......................... 10-2015-0133891

(51) Int. Cl.
*G02B 5/30*  (2006.01)
*C08F 220/34*  (2006.01)
*C08J 5/18*  (2006.01)

(52) U.S. Cl.
CPC .......... *G02B 5/3033* (2013.01); *C08F 220/34* (2013.01); *C08J 5/18* (2013.01); *C08F 2220/343* (2013.01)

(58) Field of Classification Search
CPC ...... G02B 5/30; G02B 5/3025; G02B 5/3033; G02B 5/3041; G02B 5/305; G02B 1/10;
(Continued)

(56) References Cited

U.S. PATENT DOCUMENTS 7,201,949 B2    4/2007   Houghtaling et al.
7,846,541 B2    12/2010  Hu et al.
(Continued)

FOREIGN PATENT DOCUMENTS

JP    2005162908 A    6/2005
JP    2009069429 A    4/2009
(Continued)

OTHER PUBLICATIONS

JP2005162908, English language machine translation, generated Apr. 30, 2019 (Year: 2005).*

*Primary Examiner* — Stephone B Allen
*Assistant Examiner* — Adam W Booher
(74) *Attorney, Agent, or Firm* — Dentons US LLP

(57) ABSTRACT

The present invention relates to a polarizer protective film comprising a binder resin layer in which a poly($C_{2-4}$ alkylene glycol)-modified polyfunctional urethane (meth)acrylate-based polymer and a bifunctional or higher polyfunctional (meth)acrylate-based compound form a cross-linked bond, a polarizing plate comprising the polarizer protective film and a method for preparing a polarizing plate comprising forming the polarizer protective film.

16 Claims, 1 Drawing Sheet

(58) Field of Classification Search
CPC . G02B 1/105; G02B 1/14; G02B 1/16; G02B 1/18; C08F 220/34; C08F 2220/343; C08J 5/18
See application file for complete search history.

(56) References Cited

U.S. PATENT DOCUMENTS

| | | |
|---|---|---|
| 8,319,913 B2 | 11/2012 | Hong et al. |
| 2009/0274902 A1 | 11/2009 | Kume |
| 2011/0109849 A1 | 5/2011 | Yoo et al. |
| 2015/0183945 A1* | 7/2015 | Shiraishi ................ C08J 5/18 |
| | | 359/513 |
| 2017/0306163 A1* | 10/2017 | Kim ........................ C08J 7/047 |

FOREIGN PATENT DOCUMENTS

| | | |
|---|---|---|
| JP | 2009263600 A | 11/2009 |
| JP | 2011503646 A | 1/2011 |
| JP | 5592120 B2 | 9/2014 |
| KR | 1020030056752 A | 7/2003 |
| KR | 1020060113899 A | 11/2006 |
| KR | 101007769 B1 | 1/2011 |
| KR | 1020110050952 A | 5/2011 |

\* cited by examiner

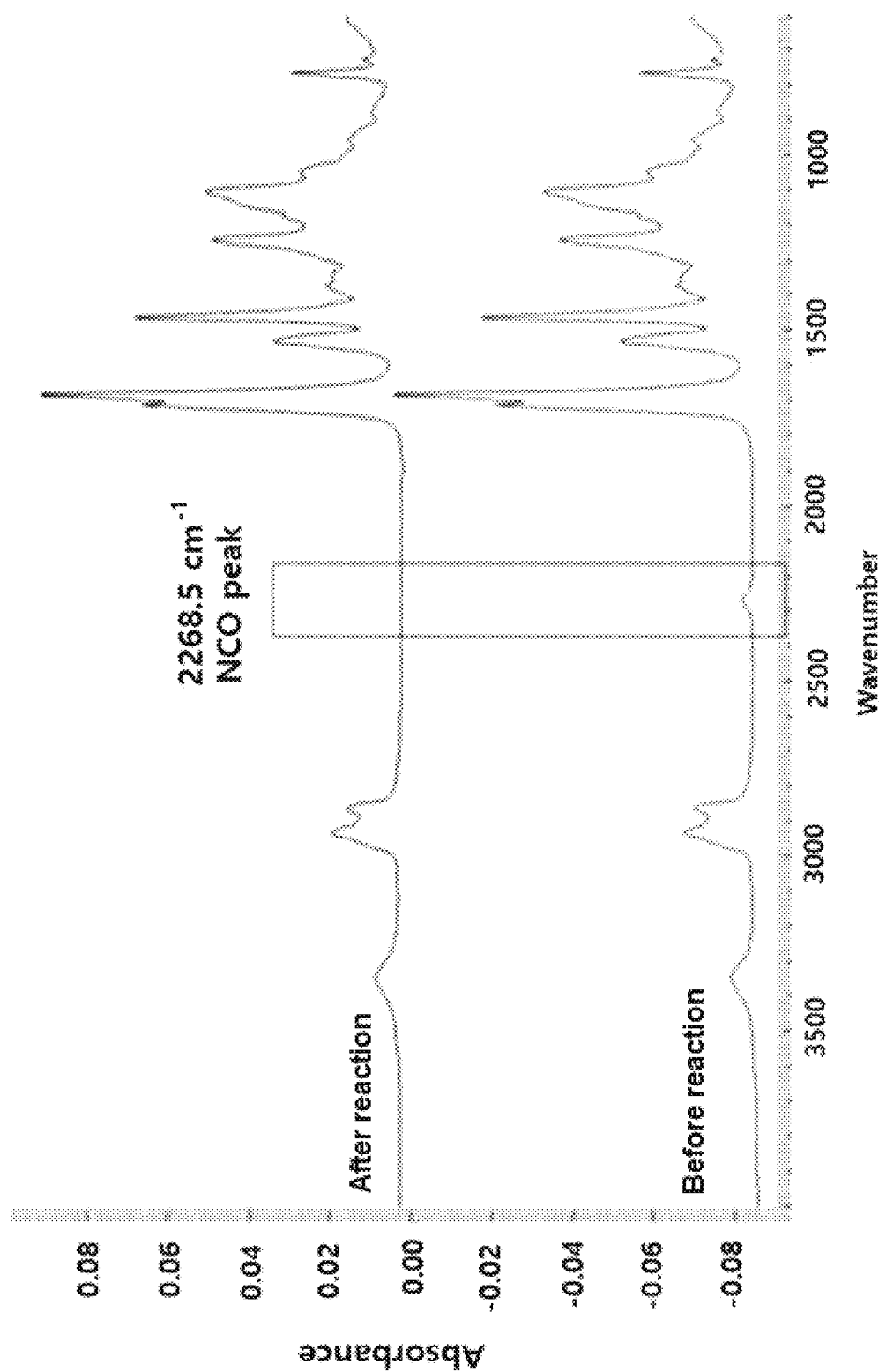

POLARIZER PROTECTIVE FILM, POLARIZING PLATE AND METHOD FOR PREPARING POLARIZING PLATE

This application is a National Stage Application of International Application No. PCT/KR 2016/010590, filed Sep. 22, 2016, and claims the benefit of Korean Patent Application No. 10-2016-0121215, filed on Sep. 22, 2016 and Korean Patent Application No. 10-2015-0133891 and Sep. 22, 2015, contents of which are incorporated herein by reference in their entirety for all purposes as if fully set forth below.

CROSS-REFERENCE TO RELATED APPLICATION(S)

This application claims the benefit of priority from Korean Patent Application No. 10-2015-0133891 filed on Sep. 22, 2015 and Korean Patent Application No. 10-2016-0121215 filed on Sep. 22, 2016 with the Korean Intellectual Property Office, the disclosures of which are incorporated herein by reference in their entirety.

FIELD OF THE INVENTION

The present invention relates to a polarizer protective film, a polarizing plate and a method for preparing a polarizing plate.

DESCRIPTION OF THE RELATED ART

A liquid crystal display (LCD) is currently one of the most widely used flat panel displays. Generally, a liquid crystal display takes a structure where a liquid crystal layer is enclosed between a TFT (thin film transistor) array substrate and a color filter substrate. If an electric filed is applied to electrodes present on the array substrate and the color filter substrate, the arrangement of liquid crystal molecules of the liquid crystal layer enclosed therebetween is changed, which allows image display.

Meanwhile, on the outer side of the array substrate and the color filter substrate, a polarizing plate is provided. The polarizing plate may control polarized light by selectively penetrating light of a specific direction, among light incident from a backlight and light passing through a liquid crystal layer. A polarizing plate generally has a structure where a protective film for supporting and protecting a polarizer is adhered to a polarizer capable of polarizing light in a certain direction.

As such a protective film, a polymer film such as triacetyl cellulose (TAC) or the like is used. However, the triacetyl cellulose (TAC) films have weak surface hardness and are vulnerable to humidity when used alone, and thus, a method for adding a functional coating layer and the like are being used for increasing surface hardness and ensuring abrasion resistance. However, when the functional coating layer is further used, the total thickness of the protective film increases, which may not meet the requirement for thinning of an electronic device, and there is a risk that curling or cracking of the film may occur due to the additional coating.

Meanwhile, in a display device having a large screen with a small thickness, a diffusion layer having irregularities or patterns on the surface is installed with a minute interval from the lower polarizing plate, for example, with an interval of 1 to 3 mm, and as described above, there is a problem that the polarizer protective film is abraded by the diffusion layer or a large amount of scratches is generated, as the TAC films do not have sufficient surface hardness and abrasion resistance.

SUMMARY OF THE INVENTION

It is one object of the present invention to provide a polarizer protective film capable of preventing the deterioration of physical and optical properties caused by abrasion or scratches on the surface and implementing sufficient flexibility such that it may be suitable for mass production process.

It is another object of the present invention to provide a polarizing plate including the polarizer protective film.

It is still another object of the present invention to provide a method for preparing a polarizing plate including the polarizer protective film.

In the present disclosure, there is provided a polarizer protective film including a binder resin layer in which a poly($C_{2-4}$ alkylene glycol)-modified polyfunctional urethane (meth)acrylate-based polymer and a bifunctional or higher polyfunctional (meth)acrylate-based compound form a cross-linked bond, wherein the weight ratio of the bifunctional or higher polyfunctional (meth)acrylate-based compound to the poly($C_{2-4}$ alkylene glycol)-modified polyfunctional urethane (meth)acrylate-based polymer is 1 to 20.

Further, in the present disclosure, there is provided a polarizing plate including a polarizer; and the polarizer protective film.

Furthermore, in the present disclosure, there is provided a method for preparing a polarizing plate, comprising forming a polarizer protective film by photocuring a coating composition including a poly($C_{2-4}$ alkylene glycol)-modified polyfunctional urethane (meth)acrylate-based polymer; a bifunctional or higher polyfunctional (meth)acrylate-based compound; and a photo-initiator; and laminating and adhering the polarizer protective film to one surface of a polarizer, wherein the weight ratio of the bifunctional or higher polyfunctional (meth)acrylate-based compound to the poly ($C_{2-4}$ alkylene glycol)-modified polyfunctional urethane (meth)acrylate-based polymer is 1 to 20.

Hereinafter, the polarizer protective film, the polarizing plate and the method for preparing a polarizing plate according to specific embodiments of the present invention will be described in more detail.

As described above, according to one embodiment of the present invention, there may be provided a polarizer protective film including a binder resin layer in which a poly($C_{2-4}$ alkylene glycol)-modified polyfunctional urethane (meth)acrylate-based polymer and a bifunctional or higher polyfunctional (meth)acrylate-based compound form a cross-linked bond, wherein the weight ratio of the bifunctional or higher polyfunctional (meth)acrylate-based compound to the poly($C_{2-4}$ alkylene glycol)-modified polyfunctional urethane (meth)acrylate-based polymer is 1 to 20.

The poly($C_{2-4}$ alkylene glycol)-modified polyfunctional urethane (meth)acrylate-based polymer is highly flexible and maintains a relatively high level of a manganese length of the cross-linked structure in the binder layer, thereby expressing a high level of elasticity in the binder layer. Due to such high level of elasticity, even if damage, such as scratches or the like, is generated on the polarizer protective film by an external physical stimulus, the damaged site is gradually filled in because of the elasticity, and thus the polarizer protective film can exhibit an excellent a self-healing property. Accordingly, the polarizer protective film can prevent the deterioration of physical and optical properties caused by abrasion or scratches on the surface while having a small thickness, and can implement sufficient flexibility such that it may be suitable for mass production process.

In order for the finally prepared polarizer protective film to have mechanical properties such as higher abrasion resistance and scratch resistance and improved optical properties, while securing a self-healing property on the surface when a scratch is generated, the binder resin layer may have a weight ratio of the bifunctional or higher polyfunctional (meth)acrylate-based compound to the poly($C_{2-4}$ alkylene glycol)-modified polyfunctional urethane (meth)acrylate-based polymer of 1 to 20 or 5 to 15.

When the weight ratio of the bifunctional or higher polyfunctional (meth)acrylate-based compound to the poly ($C_{2-4}$ alkylene glycol)-modified polyfunctional urethane (meth)acrylate-based polymer is out of the range of 1 to 20 or 5 to 15, for example, when the weight ratio is less than 1, it may be difficult for the polarizer protective film to secure sufficient scratch resistance or surface hardness, or it may be difficult to have stability against rapid temperature changes. On the contrary, when the weight ratio exceeds 20, the effect resulting from the poly($C_{2-4}$ alkylene glycol)-modified polyfunctional urethane (meth)acrylate-based polymer, for example, a self-healing property or improved mechanical properties and improved optical properties, etc., may not be implemented.

Meanwhile, the binder resin layer may be prepared by forming a cross-linked bond through photocuring of the poly($C_{2-4}$ alkylene glycol)-modified polyfunctional urethane (meth)acrylate-based polymer and the bifunctional or higher polyfunctional (meth)acrylate-based compound.

The poly($C_{2-4}$ alkylene glycol)-modified polyfunctional urethane (meth)acrylate-based polymer has a trifunctional or higher functional urethane bond and is bound to each poly($C_{2-4}$ alkylene glycol)-modified (meth)acrylate-based compound via the urethane bond, and at least two poly($C_{2-4}$ alkylene glycol)-modified (meth)acrylate-based compounds bound to each urethane bond may include poly($C_{2-4}$ alkylene glycol) repeating units whose numbers of repetitions are different from each other (for example, two to four types of poly($C_{2-4}$ alkylene glycol)-modified (meth)acrylate-based compounds including poly($C_{2-4}$ alkylene glycol) repeating units whose numbers of repetition are different from each other may be bound to a three to six functional urethane bond).

Meanwhile, the urethane bond reaction described above may be carried out according to a conventional urethane reaction condition. For example, the urethane reaction may be carried out by stirring at about 20 to 100° C. for about 1 to 10 hours, and may be carried out in the presence of a metal-containing catalyst, such as tin or the like, including DBTDL (dibutyl tin dilaurate).

More specific examples of the poly($C_{2-4}$ alkylene glycol)-modified polyfunctional urethane (meth)acrylate-based polymer may include polyethylene glycol-modified polyfunctional urethane (meth)acrylate-based polymers or polypropylene glycol-modified polyfunctional urethane (meth) acrylate-based polymers, etc., and they may be used alone or in combination thereof. More appropriately, in order to further improve the elongation and self-healing properties of the polarizer protective film, the polyethylene glycol-modified polyfunctional urethane (meth)acrylate-based polymers and polypropylene glycol-modified polyfunctional urethane (meth)acrylate-based polymers can be mixed and used.

More specifically, the poly($C_{2-4}$ alkylene glycol)-modified polyfunctional urethane (meth)acrylate-based polymer may be a reactant between a trifunctional or higher functional polyvalent isocyanate-based compound; and at least two poly($C_{2-4}$ alkylene glycol)-modified (meth)acrylate-based compounds including poly($C_{2-4}$ alkylene glycol) repeating units whose numbers of repetitions are different from each other.

For example, the poly($C_{2-4}$ alkylene glycol)-modified polyfunctional urethane (meth)acrylate-based polymer may be formed by carrying out a urethane reaction with the trifunctional or higher functional polyvalent isocyanate-based compound and at least two poly($C_{2-4}$ alkylene glycol)-modified (meth)acrylate-based compounds including poly ($C_{2-4}$ alkylene glycol) repeating units whose numbers of repetitions are different from each other. As a result of the urethane reaction, as each isocyanate group of the polyvalent isocyanate-based compounds and the hydroxyl group at the end of the poly($C_{2-4}$ alkylene glycol) repeating units form an urethane bond, they are linked together to obtain a polymer having the structure and properties described above.

The polyvalent isocyanate-based compound may be at least one selected from the group consisting of oligomers of diisocyanate compounds, polymers of diisocyanate compounds, cyclic polymers of diisocyanate compounds, hexamethylene diisocyanate isocyanurate, isophorone diisocyanate isocyanurate, toluene 2,6-diisocyanate isocyanurate, triisocyanate compounds and isomers thereof, and in addition, various trifunctional or higher functional polyvalent isocyanate compounds may be used.

Further, among the specific examples of the polyvalent isocyanate-based compounds, the oligomers, polymers, cyclic polymers of diisocynate compounds, or isocyanurate may be formed from conventional aliphatic or aromatic diisocynate compounds, or commercially available oligomers of diisocyanate compounds and the like (for example, DN980S manufactured by AEKYUNG Chemical, which is a trimer of HDI, etc.) may be used. More specific examples of these diisocyanate compounds may include ethylene diisocyanate, 1,4-tetramethylene diisocyanate, 1,6-hexamethylene diisocyanate (HDI), 1,12-dodecane diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethyl-cyclohexane, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4'-diphenylmethane diisocyanate, perhydro-4,4'-diphenylmethane diisocyanate, 1,3-phenylene diisocyanate, 1,4-phenylene diisocyanate, 4,4'-stilbene diisocyanate, 3,3'-dimethyl-4,4'-biphenylene diisocyanate (TODI), toluene 2,4-diisocyanate, toluene 2,6-diisocyanate (TDI), diphenylmethane-2,4'-diisocyanate (MDI), 2,2'-diphenylmethane diisocyanate (MDI), diphenylmethane-4,4'-diisocyanate (MDI), isophorone diisocyanate (IPDI) and the like.

The at least two poly($C_{2-4}$ alkylene glycol)-modified (meth)acrylate-based compounds may each have a number-average molecular weight of about 200 to 1000 or about 250 to 800, and may each include poly($C_{2-4}$ alkylene glycol) repeating units whose numbers of repetitions are 2 to 10 or 4 to 6.

In addition, each of the poly($C_{2-4}$ alkylene glycol)-modified (meth)acrylate-based compounds may include poly ($C_{2-4}$ alkylene glycol) repeating units whose numbers of repetitions are different from each other within the range described above and accordingly may have different molecular weights.

Specifically, the difference of the number-average molecular weight between at least two poly($C_{2-4}$ alkylene glycol)-modified (meth)acrylate-based compounds bound to the urethane bond may be 100 to 500. The number-average molecular weight for the modified (meth)acrylate-based compound may be measured by a conventionally known method such as a gas chromatograph-mass spectrometer or the like.

In a more specific example, as the poly($C_{2-4}$ alkylene glycol)-modified (meth)acrylate-based compounds, a compound having a poly($C_{2-4}$ alkylene glycol) repeating unit having a number-average molecular weight of about 100 to 400 whose number of repetitions corresponds thereto and a compound having a poly($C_{2-4}$ alkylene glycol) repeating unit having a number-average molecular weight of about 400 to 1000 whose number of repetitions corresponds thereto may each be used.

The binder resin layer may further include other known components exhibiting adequate elasticity. For example, the binder resin layer may further include a polycarbonate-modified bifunctional urethane (meth)acrylate-based polymer. The polycarbonate-modified bifunctional urethane (meth)acrylate-based polymer may be a polymer which has a bifunctional or higher functional urethane bond and which is bound to each polycarbonate-modified (meth)acrylate-based compound via the urethane bond. Further, the binder resin layer may further include polyrotaxane or polyrotaxane modified with other functional groups or compounds. The elongation and self-healing property, etc. of the polarizer protective film may be further improved, as the polycarbonate-modified bifunctional urethane (meth)acrylate-based polymer or polyrotaxane, etc. is further included in the binder resin layer.

The bifunctional or higher polyfunctional (meth)acrylate-based compound may include at least one selected from the group consisting of polyfunctional urethane acrylate, 9-ethylene glycol diacrylate (9-EGDA), bisphenol A epoxy acrylate, polyether triacrylate, pentaerythritol tri/tetraacrylate (PETA), dipentaerythritol hexa-acrylate (DPHA), trimethylolpropane triacrylate (TMPTA), and hexamethylene diacrylate (HDDA).

Meanwhile, according to another embodiment of the present invention, there may be provided a polarizing plate including a polarizer; and the polarizer protective film.

The details of the polarizer protective film include all the details described with respect to the polarizing film of one embodiment.

A polarizer exhibits a characteristic of being able to only extract light vibrating in one direction from incident light vibrating in various directions. This characteristic can be achieved by stretching polyvinyl alcohol (PVA) absorbing iodine with a strong tension. For example, more specifically, a polarizer may be formed through steps of swelling the PVA film by immersing it in an aqueous solution, dyeing the swollen PVA film with a dichroic material that imparts a polarization property, stretching the dyed PVA film to align the dichroic dye materials in the stretching direction, and complementary coloring step of correcting the color of the PVA film after the stretching step. However, the polarizer included in the polarizing plate of the embodiment is not limited to the polyvinyl alcohol (PVA) described above.

The polarizing plate may further include an adhesive layer positioned between the polarizer and the protective film. The adhesive layer may include an adhesive for a polarizer which has transparency and which can maintain the polarization properties of the polarizer. Usable adhesives are not particularly limited as long as they are known in the art. For example, it includes a one-component or two-component polyvinyl alcohol (PVA)-based adhesive, an acryl-based adhesive, a polyurethane-based adhesive, an epoxy-based adhesive, a styrene-butadiene rubber (SBR)-based adhesive, or a hot melt-type adhesive, etc., but is not limited thereto.

The thickness of the adhesive layer may vary depending on the characteristics of the polarizing plate, and may be in the range of, for example, about 0.1 to about 10 μm or about 0.1 to about 5 μm.

The polarizing plate may further include a second polarizer protective film formed on one side of the polarizer. To one side of the polarizer, the polarizer protective film of the one embodiment described above may be adhered, and to the other side of the polarizer, a commonly known polarizer protective film such as TAC or the polarizer protective film of the one embodiment may be adhered as a second polarizer protective film.

The thickness of the polarizer protective film may be from 1 to 100 μm, and the thickness of the polarizer may be from 5 to 300 μm.

Meanwhile, according to still another embodiment of the present invention, there may be provided a method for preparing a polarizing plate, comprising forming a polarizer protective film by photocuring a coating composition including a poly($C_{2-4}$ alkylene glycol)-modified polyfunctional urethane (meth)acrylate-based polymer; a bifunctional or higher polyfunctional (meth)acrylate-based compound; and a photo-initiator; and laminating and adhering the polarizer protective film to one surface of a polarizer, wherein the weight ratio of the bifunctional or higher polyfunctional (meth)acrylate-based compound to the poly($C_{2-4}$ alkylene glycol)-modified polyfunctional urethane (meth)acrylate-based polymer is 1 to 20.

The polarizer protective film may be formed by coating the coating composition on a predetermined substrate or release film and photo-curing the same.

As described above, in order for the polarizer protective film prepared by the preparation method of a polarizing plate to have mechanical properties such as higher abrasion resistance and scratch resistance and improved optical properties, while securing a self-healing property on the surface when a scratch is generated, the weight ratio of the bifunctional or higher polyfunctional (meth)acrylate-based compound to the poly($C_{2-4}$ alkylene glycol)-modified polyfunctional urethane (meth)acrylate-based polymer may be 1 to 20 or 5 to 15.

In the method for preparing a polarizing plate, the polarizer protective film is prepared by coating onto a separate substrate or release film which can be easily detached relatively, followed by curing, and not by a method of forming the polarizer protective film directly on a polarizer, and thus it can be easily peeled off in the form of a film than the cured coating composition, which can be used as a polarizer protective film.

Further, the thus-prepared polarizer protective film exhibits a low retardation value and can secure high hardness without deteriorating optical properties such as light transmittance, haze and the like. The substrate or release film can be removed by selectively peeling off before or after the protective film is adhered to the polarizer after curing of the resin composition.

The method for coating the coating composition is not particularly limited as long as it can be used in the technical field to which the present technology pertains. For example, a bar coating method, a knife coating method, a roll coating method, a blade coating method, a die coating method, a micro gravure coating method, a comma coating method, a slot die coating method, a lip coating method or solution casting method, etc. may be used.

The coating thickness of the coating composition is not limited. For example, it may be coated such that the thickness of the polarizer protective film formed after drying and curing processes is about 1 to 100 μm.

The photocuring reaction is carried out by irradiating ultraviolet rays or the like to the coated composition to thereby form the protective film. Before irradiating the ultraviolet rays, the drying process may be further carried out for planarizing the coating surface of the coating composition and volatilizing the solvent contained in the composition.

The amount of ultraviolet irradiation may be, for example, about 20 to 600 mJ/cm$^2$. The light source for the ultraviolet irradiation is not particularly limited, and for example, a high-pressure mercury lamp, a metal halide lamp, a black light fluorescent lamp and the like may be used.

As described above, the poly($C_{2-4}$ alkylene glycol)-modified polyfunctional urethane (meth)acrylate-based polymer is highly flexible and maintains a relatively high level of a manganese length of the cross-linked structure in the binder layer, thereby expressing a high level of elasticity in the polarizer protective film. Due to such high level of elasticity, even if damage, such as scratches or the like, is generated on the polarizer protective film by an external physical stimulus, the damaged site is gradually filled in because of the elasticity, and thus the polarizer protective film can exhibit an excellent self-healing property. Accordingly, the polarizer protective film can prevent the deterioration of physical and optical properties caused by abrasion or scratches on the surface while having a small thickness, and can implement sufficient flexibility such that it may be suitable for mass production process.

The binder resin layer may be prepared by forming a cross-linked bond through photocuring of the poly($C_{2-4}$ alkylene glycol)-modified polyfunctional urethane (meth) acrylate-based polymer and the bifunctional or higher polyfunctional (meth)acrylate-based compound.

The poly($C_{2-4}$ alkylene glycol)-modified polyfunctional urethane (meth)acrylate-based polymer has a trifunctional or higher functional urethane bond and is bound to each poly($C_{2-4}$ alkylene glycol)-modified (meth)acrylate-based compound via the urethane bond, and at least two poly($C_{2-4}$ alkylene glycol)-modified (meth)acrylate-based compounds bound to each urethane bond may include poly($C_{2-4}$ alkylene glycol) repeating units whose numbers of repetitions are different from each other.

In addition, each of the poly($C_{2-4}$ alkylene glycol)-modified (meth)acrylate-based compounds may include poly($C_{2-4}$ alkylene glycol) repeating units whose numbers of repetitions are different from each other within the range described above and accordingly may have different molecular weights.

Specifically, the difference of the number-average molecular weight between at least two poly($C_{2-4}$ alkylene glycol)-modified (meth)acrylate-based compounds bound to the urethane bond may be 100 to 500.

Meanwhile, the urethane bond reaction described above may be carried out according to a conventional urethane reaction condition. For example, the urethane reaction may be carried out by stirring at about 20 to 100° C. for about 1 to 10 hours, and may be carried out in the presence of a metal-containing catalyst, such as tin or the like, including DBTDL (dibutyl tin dilaurate).

As the photo-initiator, it may include benzophenone-based compounds, acetophenone-based compounds, biimidazole-based compounds, triazine-based compounds, oxime-based compounds or mixtures thereof. More specific examples thereof include benzophenone, benzoyl methyl benzoate, acetophenone, 2,4-diethyl thioxanthone, 2-chloro thioxanthone, ethyl anthraquinone, 1-hydroxy-cyclohexyl-phenyl-ketone, and commercially available products may include Irgacure 184 manufactured from Ciba Inc. or 2-hydroxy-2-methyl-1-phenyl-propan-1-one, etc.

The coating composition may further include an organic solvent; or at least one additive selected from the group consisting of an inorganic nanoparticle, a surfactant, a leveling agent and a dispersion stabilizer.

Specific examples of the organic solvent are not limited. For example, a ketone-based organic solvent, such as methyl isobutyl ketone, methyl ethyl ketone or dimethyl ketone, etc.; an alcohol organic solvent, such as isopropyl alcohol, isobutyl alcohol or normal butyl alcohol, etc.; an acetate organic solvent, such as ethyl acetate or normal butyl acetate, etc.; an cellosolve organic solvent, such as ethyl cellosolve or butyl cellosolve, etc. may be used.

As the additives such as the surfactant, leveling agent or dispersion stabilizer, any additives may be used, without particular limitation, by preparing or commercially obtaining components previously known to be usable for a composition for forming a coating layer.

Specific examples of the inorganic nanoparticles are not limited, but silica nanoparticles having a diameter of about 5 to 50 nm or about 10 to 40 nm may be used.

Further, the coating composition may include 5 to 75% by weight of the organic solvent described above. Furthermore, the coating composition may include 0.1 to 20% by weight of the additives described above.

In the present disclosure, there is provided a polarizer protective film capable of preventing the deterioration of physical or optical properties caused by abrasion or scratches on the surface and implementing sufficient flexibility such that it can be suitable for mass production process, a preparation method thereof and a polarizing plate.

BRIEF DESCRIPTION OF THE DRAWINGS

FIG. 1 shows FT-IR spectra before and after carrying out a urethane reaction for preparing the polyethylene glycol-modified polyfunctional urethane (meth)acrylate-based binder in Preparation Example 1, by comparison.

DETAILED DESCRIPTION OF THE EMBODIMENTS

Hereinafter, the present invention will be described in more detail by way of Examples. However, these Examples are given for illustrative purposes only, and the scope of the invention is not intended to be limited by these Examples.

PREPARATION EXAMPLES

Preparation Example 1

Preparation of Polyethylene Glycol-modified Polyfunctional Urethane (Meth)Acrylate-based Binder DN980S manufactured by AEKYUNG Chemical, which is an HDI-based trimer, was used as a trifunctional or higher functional polyvalent isocyanate-based compound, and as polyethylene glycol-modified (meth)acrylate-based compounds, a polyethylene glycol monoacrylate (Mn=300) and a polyethylene glycol monoacrylate (Mn=500) having different number-average molecular weights and including polyethylene glycol repeating units whose numbers of repetitions are different from each other were respectively used.

40 g of the polyvalent isocyanate-based compound, 30 g of the polyethylene glycol monoacrylate (Mn=300) and 30 g of the polyethylene glycol monoacrylate (Mn=500) were mixed with 0.1 g of DBTDL (dibutyl tin dilaurate) and 200 g of methyl ethyl ketone, and the mixture was stirred at 60° C. for about 5 hours to carry out a urethane reaction.

After completion of the urethane reaction, a polyethylene glycol-modified polyfunctional urethane (meth)acrylate-based binder of Preparation Example 1 was prepared. The progress of the urethane reaction and the formation of the binder were confirmed via FT-IR. For reference, the FT-IR spectra before and after the urethane reaction are shown in FIG. 1. Referring to FIG. 1, it was confirmed that the peak derived from the isocyanate group (—NCO) appearing at the position of about 2268.5 cm$^{-1}$ disappeared, thereby confirming the progress of the urethane reaction and the formation of the binder.

Preparation Example 2

Preparation of Polypropylene Glycol-modified Polyfunctional Urethane (Meth)Acrylate-based Binder DN980S manufactured by AEKYUNG Chemical, which is an HDI-based trimer, was used as a trifunctional or higher functional polyvalent isocyanate-based compound, and as polypropylene glycol-modified (meth)acrylate-based compounds, a polypropylene glycol monoacrylate (Mn=400) and a polypropylene glycol monoacrylate (Mn=600) having different number-average molecular weights and including polypropylene glycol repeating units whose numbers of repetitions are different from each other were each used.

40 g of the polyvalent isocyanate-based compound, 40 g of the polypropylene glycol monoacrylate (Mn=400) and 40 g of the polypropylene glycol monoacrylate (Mn=600) were mixed with 0.15 g of DBTDL (dibutyl tin dilaurate) and 300 g of methyl ethyl ketone, and the mixture was stirred at 60° C. for about 5 hours to carry out a urethane reaction.

After completion of the urethane reaction, a polypropylene glycol-modified polyfunctional urethane (meth)acrylate-based binder of Preparation Example 2 was prepared. The progress of the urethane reaction and the formation of the binder were confirmed by the disappearance of the peak derived from the isocyanate group (—NCO) appearing at the position of about 2268.5 cm$^{-1}$ via FT-IR, in the same manner as in Preparation Example 1.

Comparative Preparation Example 1

Preparation of Polyethylene Glycol-modified Polyfunctional Urethane (Meth)Acrylate-based Binder 40 g of DN980S (trifunctional or higher functional polyvalent isocyanate-based compound) manufactured by AEKYUNG Chemical, which is an HDI-based trimer, and 70 g of polyethylene glycol monoacrylate (Mn=300) were mixed with 0.1 g of DBTDL (dibutyl tin dilaurate) and 200 g of methyl ethyl ketone, and the mixture was stirred at 60° C. for about 5 hours to carry out a urethane reaction.

After completion of the urethane reaction, a polyethylene glycol-modified polyfunctional urethane (meth)acrylate-based binder of Comparative Preparation Example 1 was prepared. The progress of the urethane reaction and the formation of the binder were confirmed via FT-IR, in the same manner as in Preparation Example 1.

Comparative Preparation Example 2

Preparation of Polyethylene Glycol-modified Polyfunctional Urethane (Meth)Acrylate-based Binder 40 g of DN980S (trifunctional or higher functional polyvalent isocyanate-based compound) manufactured by AEKYUNG Chemical, which is an HDI-based trimer, and 80 g of polypropylene glycol monoacrylate (Mn=600) were mixed with 0.15 g of DBTDL (dibutyl tin dilaurate) and 300 g of methyl ethyl ketone, and the mixture was stirred at 60° C. for about 5 hours to carry out a urethane reaction.

After completion of the urethane reaction, a polyethylene glycol-modified polyfunctional urethane (meth)acrylate-based binder of Comparative Preparation Example 2 was prepared. The progress of the urethane reaction and the formation of the binder were confirmed via FT-IR, in the same manner as in Preparation Example 1.

Comparative Preparation Example 3

Preparation of Polyethylene Glycol-modified Polyfunctional Urethane (Meth)Acrylate-based Binder 40 g of DN980S (trifunctional or higher functional polyvalent isocyanate-based compound) manufactured by AEKYUNG Chemical, which is an HDI-based trimer, and 80 g of polypropylene glycol monoacrylate (Mn=200) were mixed with 0.15 g of DBTDL (dibutyl tin dilaurate) and 300 g of methyl ethyl ketone, and the mixture was stirred at 60° C. for about 5 hours to carry out a urethane reaction.

After completion of the urethane reaction, a polyethylene glycol-modified polyfunctional urethane (meth)acrylate-based binder of Comparative Preparation Example 3 was prepared. The progress of the urethane reaction and the formation of the binder were confirmed via FT-IR, in the same manner as in Preparation Example 1.

Comparative Preparation Example 4

Preparation of Polyethylene Glycol-modified Polyfunctional Urethane (Meth)Acrylate-based Binder 40 g of DN980S (trifunctional or higher functional polyvalent isocyanate-based compound) manufactured by AEKYUNG Chemical, which is an HDI-based trimer, and 80 g of polypropylene glycol monoacrylate (Mn=1000) were mixed with 0.15 g of DBTDL (dibutyl tin dilaurate) and 300 g of methyl ethyl ketone, and the mixture was stirred at 60° C. for about 5 hours to carry out a urethane reaction.

After completion of the urethane reaction, a polyethylene glycol-modified polyfunctional urethane (meth)acrylate-based binder of Comparative Preparation Example 4 was prepared. The progress of the urethane reaction and the formation of the binder were confirmed via FT-IR, in the same manner as in Preparation Example 1.

EXAMPLES

Preparation of Polarizer Protective Films and Polarizing Plates

Example 1

(1) Preparation of Composition for Forming Polarizer Protective Film

The polyethylene glycol-modified polyfunctional urethane (meth)acrylate-based binder obtained in Preparation Example 1 and dipentaerythritol hexaacrylate (DPHA), as a bifunctional or higher polyfunctional (meth)acrylate-based compound, were mixed at a weight ratio of 1:8 to prepare a composition for forming a binder.

Then, a coating composition of Example 1 was prepared by mixing 2 parts by weight of a UV initiator (Irgacure 184), 5 parts by weight of a leveling agent (tego glide 270 manufactured by Evonik) and 35 parts by weight of methyl ethyl ketone based on 100 parts by weight of the composition for forming a binder.

(2) Preparation of Polarizer Protective Film

The coating composition of Example 1 was coated on a PET release film to have a thickness of 30 μm, dried in an oven at 60° C. for 2 minutes and irradiated with ultraviolet rays with an intensity of 100 mJ/cm$^2$ to prepare a polarizer protective film having a self-healing property.

(3) Preparation of Polarizing Plate

The polarizer protective film prepared above was laminated and adhered to a polyvinyl alcohol (PVA) film using an acryl-based adhesive (thickness: about 1 μm), and the PET release film was peeled off. Then, a triacetyl cellulose (TAC) film having a thickness of 60 μm was laminated and adhered to the other side of the polyvinyl alcohol (PVA) film to which the polarizer protective film is not adhered using an acryl-based adhesive (thickness: about 1 μm) to prepare a polarizing plate.

Example 2

A composition for forming a polarizer protective film, polarizer protective film and polarizing plate were prepared in the same manner as in Example 1, except that the polyethylene glycol-modified polyfunctional urethane (meth)acrylate-based binder obtained in Preparation Example 2 was used.

Example 3

(1) Preparation of Composition for Forming Polarizer Protective Film

A coating composition was prepared in the same manner as in Example 1.

(2) Preparation of Polarizer Protective Film

The coating composition prepared above was coated on a PET release film to have a thickness of 60 μm, dried in an oven at 60° C. for 2 minutes and irradiated with ultraviolet rays with an intensity of 100 mJ/cm$^2$ to prepare a polarizer protective film having a self-healing property.

(3) Preparation of Polarizing Plate

The polarizer protective film prepared above was laminated and adhered to a polyvinyl alcohol (PVA) film using an acryl-based adhesive (thickness: about 1 μm), and the PET release film was peeled off. Then, a triacetyl cellulose (TAC) film having a thickness of 60 μm was laminated and adhered to the other side of the polyvinyl alcohol (PVA) film to which the polarizer protective film is not adhered using an acryl-based adhesive (thickness: about 1 μm) to prepare a polarizing plate.

Example 4

(1) Preparation of Composition for Forming Polarizer Protective Film

The polyethylene glycol-modified polyfunctional urethane (meth)acrylate-based binder obtained in preparation Example 1, the polyethylene glycol-modified polyfunctional urethane (meth)acrylate-based binder obtained in Preparation Example 2 and dipentaerythritol hexaacrylate (DPHA), as a bifunctional or higher polyfunctional (meth)acrylate-based compound, were mixed at a weight ratio of 1:1:10 to prepare a composition for forming a binder.

Then, a coating composition of Example 4 was prepared by mixing 2 parts by weight of a UV initiator (Irgacure 184), 5 parts by weight of a leveling agent and 35 parts by weight of methyl ethyl ketone based on 100 parts by weight of the composition for forming a binder.

(2) Preparation of Polarizer Protective Film and Polarizing Plate

A composition for forming a polarizer protective film, polarizer protective film and polarizing plate were prepared in the same manner as in Example 1, except that the coating composition of Example 4 was used.

COMPARATIVE EXAMPLES

Comparative Example 1

A triacetyl cellulose (TAC) film [polarizer protective film] having a thickness of 60 μm was laminated and adhered to a polyvinyl alcohol (PVA) film using an acryl-based adhesive (thickness: about 1 μm). Then, a triacetyl cellulose (TAC) film having a thickness of 60 μm was laminated and adhered to the other side of the polyvinyl alcohol (PVA) film using an acryl-based adhesive (thickness: about 1 μm) to prepare a polarizing plate.

Comparative Example 2

A composition for forming a polarizer protective film, polarizer protective film and polarizing plate were prepared in the same manner as in Example 1, except that the polyethylene glycol-modified polyfunctional urethane (meth)acrylate-based binder obtained in Comparative Preparation Example 1 was used.

Comparative Example 3

A composition for forming a polarizer protective film, polarizer protective film and polarizing plate were prepared in the same manner as in Example 1, except that the polyethylene glycol-modified polyfunctional urethane (meth)acrylate-based binder obtained in Comparative Preparation Example 2 was used.

Comparative Example 4

A composition for forming a polarizer protective film, polarizer protective film and polarizing plate were prepared in the same manner as in Example 1, except that a composition for forming a binder was prepared by mixing the polyethylene glycol-modified polyfunctional urethane (meth)acrylate-based binder obtained in Preparation Example 1 and dipentaerythritol hexaacrylate (DPHA), as a bifunctional or higher polyfunctional (meth)acrylate-based compound, at a weight ratio of 2:1.

Comparative Example 5

A composition for forming a polarizer protective film, polarizer protective film and polarizing plate were prepared in the same manner as in Example 1, except that a coating composition was prepared by mixing 2 parts by weight of a UV initiator (Irgacure 184), 5 parts by weight of a leveling agent (tego glide 270 manufactured by Evonik) and 35 parts by weight of methyl ethyl ketone based on 100 parts by weight of dipentaerythritol hexaacrylate (DPHA).

Comparative Example 6

A composition for forming a polarizer protective film, polarizer protective film and polarizing plate were prepared in the same manner as in Example 1, except that the polyethylene glycol-modified polyfunctional urethane (meth)acrylate-based binder obtained in Comparative Preparation Example 3 was used.

Comparative Example 7

A composition for forming a polarizer protective film, polarizer protective film and polarizing plate were prepared in the same manner as in Example 1, except that the polyethylene glycol-modified polyfunctional urethane (meth)acrylate-based binder obtained in Comparative Preparation Example 4 was used.

EXPERIMENTAL EXAMPLES

1. Measurement of Scratch Resistance

The surface of each polarizer protective film of Examples and Comparative Examples was reciprocatively rubbed 10 times by applying a constant load to a brightness-enhancing diffusion film, and then the load at which the scratches were generated on the surface of the polarizer protective film was compared.

[OK: no scratch generated at the relevant load/NG: scratch generated at the relevant load]

2. Measurement of Scratch Self-healing Property Using Copper Wire Brush

After generating the scratches on the surface of the polarizer protective films of Examples and Comparative Examples using a copper wire brush, a period of time during which the scratches were restored was measured.

Specifically, a black PET film was laminated on the back surface of the polarizer protective film, and then dust on the surface of the film was removed using a nitrogen breeze. Then, a scratch was generated by a copper wire brush on the surface of the film under a three-wavelength lamp, and the time until the scratch disappeared was measured. Herein, the generation of the scratch was determined by whether the light of the three-wavelength lamp was reflected on the scratch and the scratch was observed with the naked eye, and the disappearance of the scratch was also determined by whether the light of the three-wavelength lamp was observed with the naked eye.

3. Measurement of Pencil Hardness

Using a pencil hardness tester (Chungbuk Tech), the pencil hardness of the surface of the polarizer protective films of Examples and Comparative Examples was measured under a constant load of 500 g. Specifically, the hardness was measured using a standard pencil (Mitsubishi Inc.) having a hardness of 6B to 9H, and the measurement was repeated five times with a measurement length of 3 cm. Herein, scratches (0.5 cm) in the early stage of the measurement may not allow force to act uniformly on the part where the load starts to be applied, and thus, the surface hardness was determined by using scratches (2.5 cm) in the second half of the measurement.

4. Thermal Shock Test

The polarizing plates obtained in Examples and Comparative Examples were laminated on a glass plate with an adhesive and then placed in a light-shielded room at room temperature for 24 hours to complete the adhesion. In this way, six test samples were prepared for each polarizing plate.

Then, a temperature change condition was applied in which the process of exposing these test samples to a temperature of 80° C. for 30 minutes, followed by exposure to −30° C. for 30 minutes and back to 80° C. is one cycle, and the process was repeated 100 cycles.

After repeating for 100 cycles, the samples were observed to evaluate the deformation of the polarizer, the occurrence of a crack and the adhesion state of the film. Herein, the deformation of the polarizer was determined by whether the axis of the polarizer was warped, the occurrence of a crack was determined by whether a gap was generated in the polarizer and the light was transmitted therethrough, and the adhesion state of the film was determined by whether a bubble was generated or a phenomenon where the film is detached from the edge had occurred.

When any of the problems of the deformation of the polarizer, the occurrence of a crack and the adhesion state of the film occurred, it was evaluated as NG, and when none of the problems occurred, it was evaluated as OK.

The results of the physical properties measured above are summarized and shown in the following Tables 1 and 2.

TABLE 1

|  | Example1 | Example2 | Example3 | Example4 |
| --- | --- | --- | --- | --- |
| Scratch Resistance Load | 700 g OK | 600 g OK | 700 g OK | 700 g OK |
| Scratch Self-Healing Property Using Copper Wire Brush | 1 second or less | 1 second or less | 1 second or less | 1 second or less |
| Pencil Hardness (500 g) | HB | HB | HB | HB |
| Thermal Shock Test | OK | OK | OK | OK |

TABLE 2

|  | Comparative Example 1 | Comparative Example 2 | Comparative Example 3 | Comparative Example 4 | Comparative Example 5 | Comparative Example 6 | Comparative Example 7 |
| --- | --- | --- | --- | --- | --- | --- | --- |
| Scratch Resistance Load | 10 g OK 50 g NG | 700 g OK | 10 g OK 50 g NG | 50 g OK 100 g NG | 700 g OK | 700 g OK | 10 g OK 50 g NG |
| Scratch Self-Healing Property Using Copper Wire Brush | Not healed | 3 seconds or more | 1 second or less | 1 second or less | Not healed | 5 seconds or more | 1 second or less |
| Pencil Hardness (500 g) | B | HB | B | B | 3H | HB | B |
| Thermal Shock Test | OK | NG (crack) | NG (bubble) | NG (bubble) | NG (crack) | NG (crack) | NG (bubble) |

As shown in the Tables 1 and 2, it was confirmed that the polarizer protective films obtained from Examples can prevent the deterioration of physical and optical properties caused by abrasion or scratches on the surface while having a high scratch resistance, and exhibits a self-healing property on the surface when a scratch is generated, compared to the polarizer protective films of the Comparative Examples.

In addition, it was confirmed that the polarizer protective films of Examples not only exhibit an excellent pencil hardness, but also exhibit excellent stability in which the problem in the adhesion of the film, which occurs repeatedly, does not occur even under a large temperature change or the internal and external shapes and structures are not deformed.

The invention claimed is:

1. A polarizer protective film comprising a binder resin layer in which a poly($C_{2-4}$ alkylene glycol)-modified polyfunctional urethane (meth)acrylate-based polymer and a bifunctional or higher polyfunctional (meth)acrylate-based compound form a cross-linked bond,
wherein the weight ratio of the bifunctional or higher polyfunctional (meth)acrylate-based compound to the poly($C_{2-4}$ alkylene glycol)-modified polyfunctional urethane (meth)acrylate-based polymer is from 1.1 to 1.20, and
wherein the poly($C_{2-4}$ alkylene glycol)-modified polyfunctional urethane (meth)acrylate-based polymer has a trifunctional or higher functional urethane bond and is bound to each poly($C_{2-4}$ alkylene glycol)-modified (meth)acrylate-based compound via the urethane bond, and at least two poly($C_{2-4}$ alkylene glycol)-modified (meth)acrylate-based compounds bound to each urethane bond comprises poly($C_{2-4}$ alkylene glycol) repeating units whose numbers of repetitions are different from each other.

2. The polarizer protective film of claim 1, wherein the difference of the number-average molecular weight between at least two poly($C_{2-4}$ alkylene glycol)-modified (meth)acrylate-based compounds bound to the urethane bond is 100 to 500.

3. The polarizer protective film of claim 1, wherein the poly($C_{2-4}$ alkylene glycol)-modified polyfunctional urethane (meth)acrylate-based polymer comprises at least one selected from the group consisting of a polyethylene glycol-modified polyfunctional urethane (meth)acrylate-based polymer and a polypropylene glycol-modified polyfunctional urethane (meth)acrylate-based polymer.

4. The polarizer protective film of claim 1, wherein the poly($C_{2-4}$ alkylene glycol)-modified polyfunctional urethane (meth)acrylate-based polymer is a reactant between a trifunctional or higher functional polyvalent isocyanate-based compound; and at least two poly($C_{2-4}$ alkylene glycol)-modified (meth)acrylate-based compounds including poly ($C_{2-4}$ alkylene glycol) repeating units whose numbers of repetitions are different from each other.

5. The polarizer protective film of claim 4, wherein the polyvalent isocyanate-based compound is selected from the group consisting of an oligomer of a diisocyanate compound, a polymer of a diisocyanate compound, a cyclic polymer of a diisocyanate compound, hexamethylene diisocyanate isocyanurate, isophorone diisocyanate isocyanurate, toluene 2,6-diisocyanate isocyanurate, a triisocyanate compound and an isomer thereof.

6. The polarizer protective film of claim 4, wherein each of the at least two poly ($C_{2-4}$ alkylene glycol)-modified (meth)acrylate-based compounds including poly ($C_{2-4}$ alkylene glycol) repeating units whose numbers of repetitions are different from each other has a number-average molecular weight of 200 to 1000.

7. The polarizer protective film of claim 1, wherein the binder resin layer further includes a polycarbonate-modified bifunctional urethane (meth)acrylate-based polymer.

8. The polarizer protective film of claim 7, wherein the polycarbonate-modified bifunctional urethane (meth)acrylate-based polymer has a bifunctional or higher functional urethane bond and is bound to each polycarbonate-modified (meth)acrylate-based compound via the urethane bond.

9. The polarizer protective film of claim 1, wherein the bifunctional or higher polyfunctional (meth)acrylate-based compound includes at least one selected from the group consisting of polyfunctional urethane acrylate, 9-ethylene glycol diacrylate (9-EGDA), bisphenol A epoxy acrylate, polyether triacrylate, pentaerythritol tri/tetraacrylate (PETA), dipentaerythritol hexa-acrylate DPHA), trimethylolpropane triacrylate (TMPTA) and hexamethylene diacrylate (HDDA).

10. The polarizer protective film of claim 1, wherein the weight ratio of the bifunctional or higher polyfunctional (meth)acrylate-based compound relative to the poly ($C_{2-4}$ alkylene glycol)-modified polyfunctional urethane (meth) acrylate-based polymer is from 1.5 to 1.15.

11. A polarizing plate comprising a polarizer and the polarizer protective film of claim 1.

12. The polarizing plate of claim 11, further comprising an adhesive layer positioned between the polarizer and the protective film.

13. The polarizing plate of claim 11, further comprising a second polarizer protective film formed on one side of the polarizer.

14. The polarizing plate of claim 11, wherein the thickness of the polarizer protective film is 1 μm to 100 μm, and the thickness of the polarizer is 5 μm to 300 μm.

15. A method for preparing a polarizing plate, comprising forming a polarizer protective film by photocuring a coating composition including a poly ($C_{2-4}$ alkylene glycol)-modified polyfunctional urethane (meth)acrylate-based polymer; a bifunctional or higher polyfunctional (meth)acrylate-based compound; and a photo-initiator; and laminating and adhering the polarizer protective film to one surface of a polarizer, wherein the weight ratio of the bifunctional or higher polyfunctional (meth)acrylate-based compound to the poly ($C_{2-4}$ alkylene glycol)-modified polyfunctional urethane (meth)acrylate-based polymer is from 1.1 to 1.20, and wherein the poly($C_{2-4}$ alkylene glycol)-modified polyfunctional urethane (meth)acrylate-based polymer has a trifunctional or higher functional urethane bond and is bound to each poly($C_{2-4}$ alkylene glycol)-modified (meth)acrylate-based compound via the urethane bond, and at least two poly($C_{2-4}$ alkylene glycol)-modified (meth)acrylate-based compounds bound to each urethane bond comprises poly($C_{2-4}$ alkylene glycol) repeating units whose numbers of repetitions are different from each other.

16. The method for preparing a polarizing plate of claim 15, wherein the coating composition further includes an organic solvent; or at least one additive selected from the group consisting of an inorganic nanoparticle, a surfactant, a leveling agent and a dispersion stabilizer.

* * * * *